Oct. 27, 1942.   J. B. WHITTED   2,299,865
SHUT-OFF VALVE
Filed May 31, 1941   3 Sheets-Sheet 1
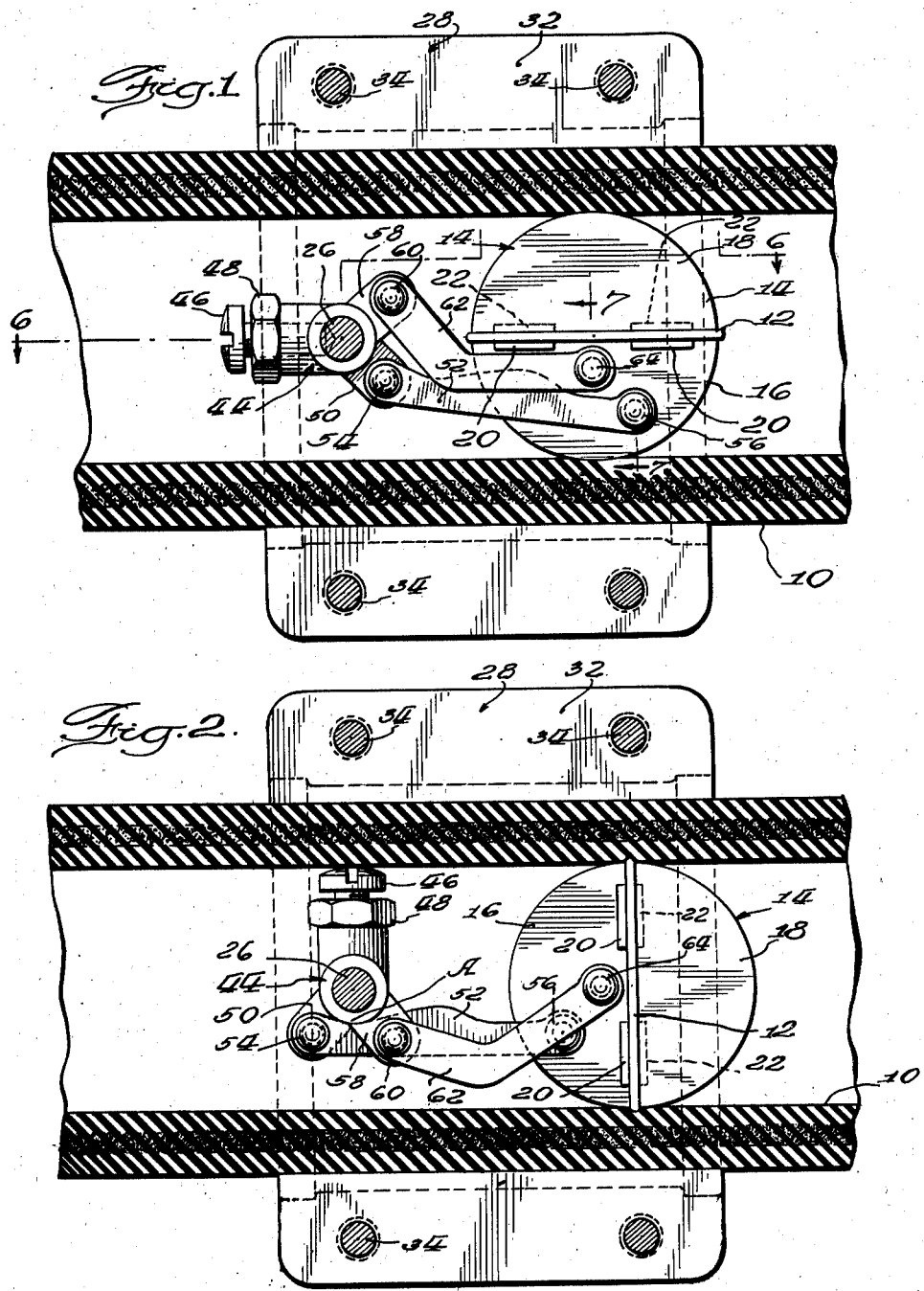
Inventor
John B. Whitted
By Williams, Bradbury & Hinkle
Attys.

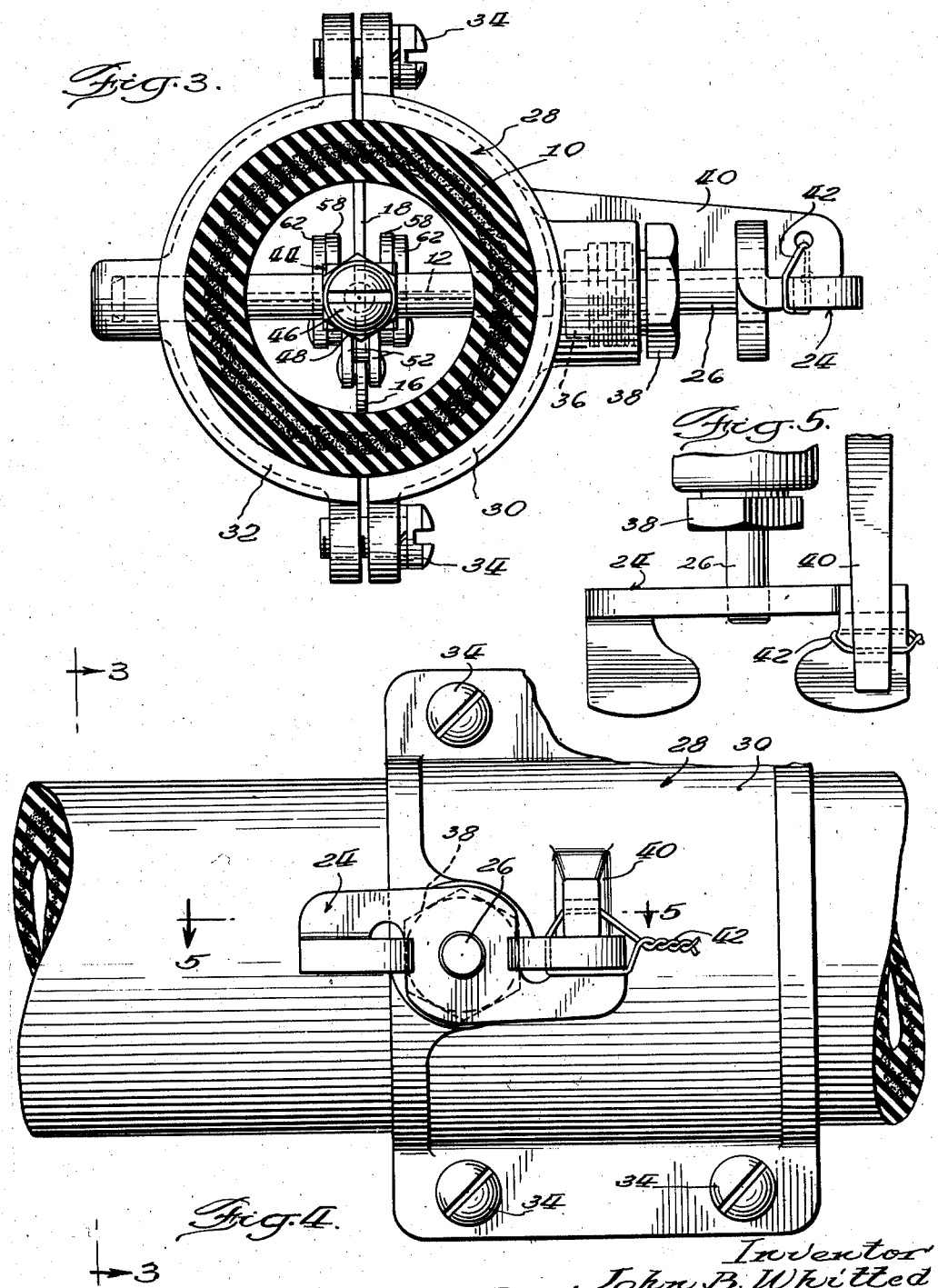

Oct. 27, 1942.   J. B. WHITTED   2,299,865
SHUT-OFF VALVE
Filed May 31, 1941   3 Sheets-Sheet 3
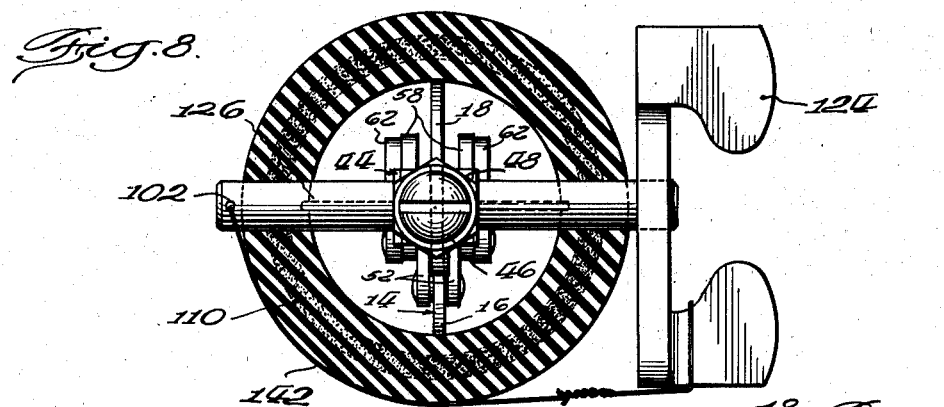
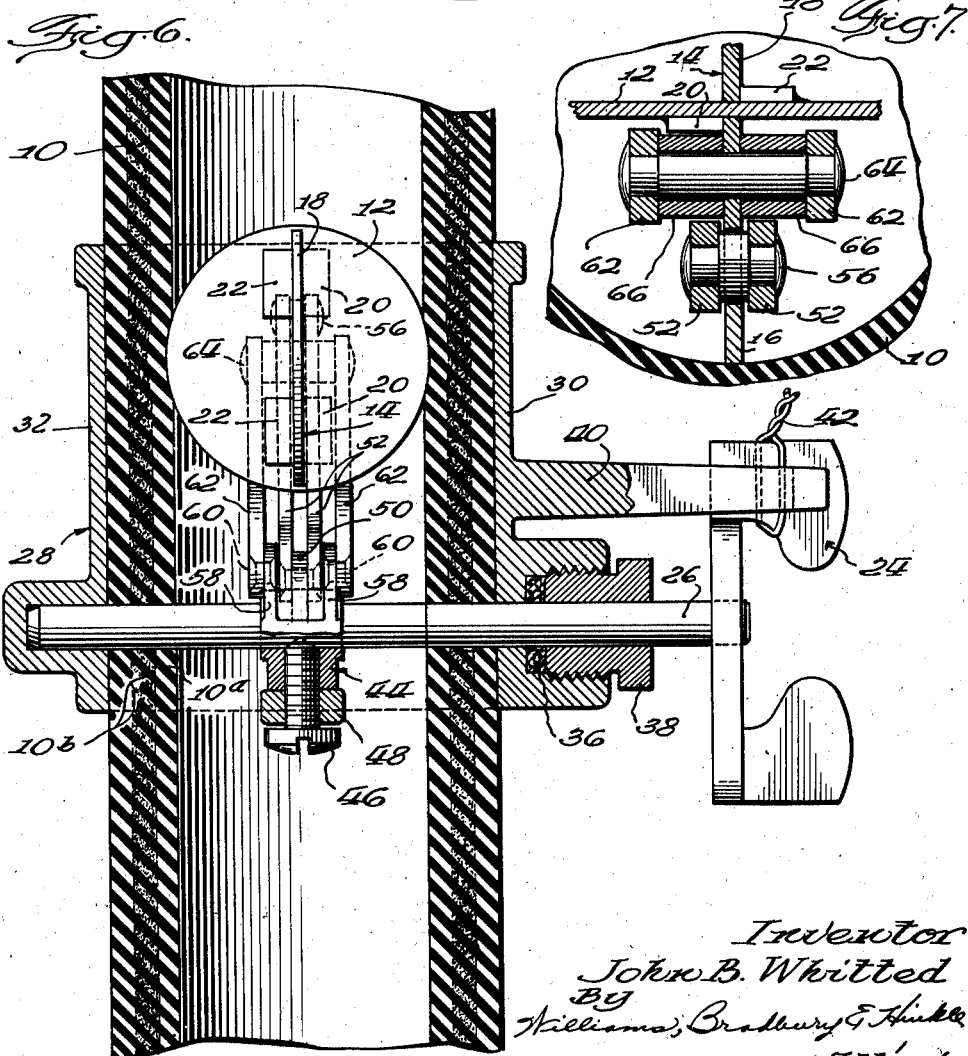

Patented Oct. 27, 1942

2,299,865

UNITED STATES PATENT OFFICE 2,299,865

SHUTOFF VALVE

John B. Whitted, Glencoe, Ill., assignor to Stewart-Warner Corporation, Chicago, Ill., a corporation of Virginia Application May 31, 1941, Serial No. 396,111

6 Claims. (Cl. 251—11)

My invention relates to shut-off valves and is more particularly concerned with shut-off valves of a type adapted for, but not necessarily limited to, use in the so-called bullet-proof fuel lines of military airplanes.

The fuel tanks in military airplanes are commonly connected to the air plane engines by fuel lines so constructed that holes created therein by rifle or machine gun bullets or shell fragments of comparable size are automatically sealed against leakage by structural elements of the fuel lines. These fuel lines, however, are sometimes completely severed or injured beyond the point of self-repair and in such instances it is important to have in the fuel line a shut-off valve to prevent loss of the fuel remaining in the fuel tank.

An object of my invention is to provide a shut-off valve which can be readily inserted in such a fuel line and which, when closed, will effectively seal the fuel line against even slight leakage and eliminate fire hazard resulting therefrom.

Another object of my invention is to provide a shut-off valve which offers a minimum of restriction to flow of fuel when the valve is in open position.

Another object of my invention is to provide a shut-off valve wherein the closer member is at a point remote from the operating shaft.

Another object of my invention is to provide a shut-off valve which can be inexpensively manufactured in large quantities by existing machinery.

Other objects and advantages will become apparent as the description proceeds.

In the drawings:

Figure 1 is a longitudinal section through a fuel line incorporating a shut-off valve embodying one form of my invention. In this figure, the valve is shown in the open position.

Fig. 2 is a view similar to Fig. 1, but showing the valve in closed position;

Fig. 3 is a transverse section and is taken on the line 3—3 of Fig. 4;

Fig. 4 is a side elevation showing the handle mechanism for operating the valve;

Fig. 5 is a partial section taken on the line 5—5 of Fig. 4;

Fig. 6 is an irregular longitudinal section taken on the line 6—6 of Fig. 1;

Fig. 7 is an irregular partial section taken on the line 7—7 of Fig. 1; and

Fig. 8 is a view similar to Fig. 3 but illustrating a modified form of my invention.

Referring to Figures 1 to 7, inclusive, it will be seen that I have illustrated my invention as incorporated in a fuel line 10 composed of a multiplicity of layers and so constructed that a hole caused by a bullet or shell fragment will automatically be instantly sealed against leakage of fuel. Such fuel lines are ordinarily composed of rubber or rubber-like materials and are well known in the art so that further description is unnecessary herein.

My shut-off valve is preferably located in the fuel line adjacent the point of connection between this line and a fuel tank, and it is to be understood that the fuel line 10 is connected to a tank at or about the left-hand edge of the drawing. It is important to have the shut-off valve located as close as possible to the fuel tank for two reasons. First, it is easier to insert the shut-off valve in the hose and assemble it in position, and second, the shut-off valve should be on the tank side of any injury to the fuel line.

My shut-off valve comprises a valve disk 12 which normally lies in a plane passing through the axis of the fuel line, as shown in Figure 1. This disk 12 may be stamped or otherwise formed from sheet material and is preferably of slightly greater diameter than the internal diameter of the fuel line 10. The edge of the valve disk 12 is preferably rounded to eliminate sharp edges which would unnecessarily wear or cut the interior of the fuel line 10.

Attached to the valve disk 12 is a circular vane 14 which is of slightly smaller diameter than the valve disk 12. This vane 14 is composed of semi-circular parts 16 and 18 stamped or otherwise formed from sheet material and suitably attached to the valve disk 12. In the drawing I have shown the semi-circular portion 16 as being provided with a pair of laterally extending fingers 20, which are welded to the valve disk 12. The semi-circular portion 18 is similarly provided with a pair of laterally extending fingers 22, likewise welded to the valve disk 12.

The circular vane 14 lies in a plane passing through the axis of the fuel line, but lying at right angles to the plane of the valve disk 12. The vane 14 cooperates with the valve disk 12 in holding the latter in its predetermined open position and in guiding the valve disk in its movement between open and closed positions.

The valve disk 12 is moved from open to closed position by a handle 24 attached to a shaft 26 extending through the walls of the fuel line 10. The structure of the walls of the fuel line is such that a fluid-tight seal is maintained between these walls and the shaft 26 so that no leakage occurs along this shaft. In the embodiment of Figures 1 to 7, inclusive, this shaft is journaled in a split ring 28 formed of semi-circular sections 30 and 32 secured together by screws 34.

Where the sole purpose of the ring 28 is to provide bearings for the shaft 26, this ring is preferably made of an aluminum or magnesium alloy, or other relatively light material. On the other hand, where this ring is intended to protect the valve parts against bullets or shell fragments, this ring is made of hardened steel or other bullet resisting material.

Referring particularly to Figure 6 it will be seen that the semi-circular portion 30 of the ring 28 is provided with a recess holding a packing 36 around the shaft 26, the packing being urged against the shaft by a gland nut 38. The semi-circular portion 30 also has a rigid arm 40 to which one end of the handle 24 is attached by a wire or other suitable means 42 to lock the valve in open position. The wire 42 is relatively weak so that it will break when a strong manual turning movement is applied to the handle 24.

A sleeve 44 is attached to the shaft 26 by a screw 46 which is illustrated as having a pointed end extending into a recess in the shaft. A lock nut 48 holds the screw 46 against rotation. The sleeve 44 has a central downwardly extending arm 50 pivotally connected to a pair of links 52 by a common pin 54 having riveted ends which prevent separation of the links from the arm 50. The other ends of the links 52 are pivoted to the vane section 16 by a pin 56 whose ends are likewise riveted to retain the links thereon.

The sleeve 44 also has a pair of upwardly extending arms 58, each of which is pivotally connected by a pin 60 to a link 62 having its other end attached to a pin 64 extending through the vane section 16 above the pin 56. The ends of the pin 64 are riveted or otherwise enlarged to retain the link 62 and spacing sleeves 66 are interposed between the link 62 and the vane section 16.

My shut-off valve is normally in the open position shown in Figure 1, and is held against accidental displacement from this position by the wire 42. In case the fuel line is shot away, the handle 24 is firmly gripped and rotated through approximately ninety degrees. This breaks the retaining wire 42 and shifts the valve from the open position shown in Figure 1 to the closed position shown in Figure 2. In this latter position the edge of the valve disk presses into the wall of the fuel line and forms an absolutely fluid-tight seal therewith. This is extremely important, as even a slight leakage of gasoline might result in a fire which would destroy the plane and imperil the lives of its occupants.

In order to accommodate the movement of the valve from open to closed position, the pairs of links 52 and 62 are offset with respect to each other so that the links 52 can pass between the links 62. When the valve is in fully closed position, the upper surfaces of the links 52 engage the lower surface of the sleeve 44, as indicated at A in Figure 2, and this engagement prevents movement of the valve beyond its fully closed position.

An important feature of my shut-off valve lies in the fact that the valve engages the fuel line at a point remote from the place where the operating shaft passes through the walls of the fuel line. This prevents local distortion of the walls of the fuel line resulting from the projection of the control shaft therethrough from interfering in any way with the sealing function of the valve. I have found that in most instances the walls of the fuel line provide adequate bearings for the control shaft. The control shaft passes through punched openings in the walls of the fuel line, these openings having been punched out to a diameter smaller than that of the control shaft. The walls thus fit tightly about the control shaft and the inner layer 10a seals tightly against the control shaft and prevents leakage of gasoline therebetween. If any slight leakage of gasoline should occur between the layer 10a and the control shaft, such leakage will be stopped by swelling of the layer 10b, which is usually formed of uncured rubber or similar material.

In Figure 8 I have illustrated an embodiment of my invention in which the metal ring 28 of the previous embodiment has been eliminated. In this form of my invention, the control shaft 126 is journaled directly in the walls of the fuel line 110 and is rotated by a handle 124 attached to one end of the shaft. The other end of this shaft is provided with a hole 102 for receiving the wire 142 which locks the valve in open position. This wire breaks when a strong turning movement is exerted on the handle 124. In all other respects the shut-off valve of Figure 8 may be identical with the shut-off valve of the previous embodiment.

In assembling the shut-off valve in a fuel line, the sub-assembly comprising the valve disk 12, vane 14, sleeve 44 and connecting links 52 and 62 are inserted in the tank end of the fuel line. The control shaft is then passed through one wall of the fuel line, through the sleeve 44, and then through the other wall of the fuel line. Where the ring 28 of the first embodiment is utilized, it will be understood that the control shaft is assembled in the semi-circular portion 30 of the ring before being passed through the first wall of the fuel line and after the shaft has been passed completely through the fuel line, the semi-circular portion 32 is slipped over the end of the shaft and the portions 30 and 32 secured together to form the completed ring 28.

The sleeve 44 is next firmly secured to the control shaft by inserting a screw driver into the tank end of the fuel line and tightening the screw 46. Thereafter, a socket wrench or similar tool is inserted into the tank end of the fuel line to tighten the lock nut 48. The handle is then wired to lock the valve in open position and the assembly operation is completed.

While I have illustrated and described only two embodiments of my invention, it is to be understood that my invention may assume numerous other forms and that the scope of my invention is defined by the following claims.

I claim:

1. A shut-off valve comprising a valve disk of appropriate size to close a conduit in which it is located, a circular vane perpendicular to said valve disk and of slightly smaller diameter than said disk, said vane engageable with the walls of said conduit to position and guide said disk, a control shaft for shifting said valve and vane, a linkage connecting said vane with said control shaft and means for rotating said control shaft.

2. A shut-off valve of the class described comprising a generally circular valve disk adapted to be enclosed in a conduit and of size suitable to seal said conduit, a control shaft extending into said conduit at a point remote from said valve, a generally circular vane perpendicular to said valve disk and engageable with the walls of said conduit to position and guide said disk, and linkage connecting said vane and said control shaft, whereby rotation of said control shaft opens or closes said valve disk.

3. A shut-off valve of the class described comprising a flexible fuel line, a circular valve disk adapted to be located in said flexible fuel line and of suitable size to close said line, a straight, continuous control shaft extending through both walls of said fuel line and supported by and forming a fluid tight seal with said walls, a sleeve in said fuel line rotatable with said shaft, and a pair of offset links connecting said sleeve with said valve and preventing movement of said valve past fully closed position.

4. A control valve for a bullet-proof fuel line comprising a valve disk located in said line, a single circular vane perpendicular to said valve disk and cooperating with the latter to position and guide said valve disk, a control shaft remote from said valve disk and journaled in the walls of said fuel line and two pairs of offset links connecting said vane and said shaft whereby rotation of said shaft opens or closes said valve.

5. A shut-off valve for the bullet-proof fuel line of a military airplane comprising a flexible fuel line, a valve disk located in and adapted to seal against the internal surface of said fuel line, means carried by said valve for guiding and positioning said valve in said fuel line, a shaft for opening and closing said valve, and means connecting said shaft with said guiding means.

6. A shut-off valve comprising a valve disk adapted for location in a bullet-proof fuel line, a control shaft extending into said fuel line at a point remote from said valve disk, means connecting said valve disk with said control shaft for rotation thereby, and a metal sleeve surrounding said fuel line and providing bearing means for said control shaft, said sleeve surrounding and protecting said valve disk.

JOHN B. WHITTED.